(12) United States Patent
Neff et al.

(10) Patent No.: US 7,161,109 B2
(45) Date of Patent: Jan. 9, 2007

(54) GAS METAL ARC WELDING OF COATED STEELS AND SHIELDING GAS THEREFOR

(75) Inventors: Jeremy B. Neff, Lockport, NY (US); Kevin A. Lyttle, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/868,888

(22) Filed: Jun. 17, 2004

(65) Prior Publication Data

US 2005/0040143 A1    Feb. 24, 2005

(51) Int. Cl.
*B23K 9/173* (2006.01)

(52) U.S. Cl. ..................... 219/74; 219/137 R
(58) Field of Classification Search ............... 219/74, 219/137 R
See application file for complete search history.

(56) References Cited

U.S. PATENT DOCUMENTS

| | | | | |
|---|---|---|---|---|
| 3,496,323 | A | | 2/1970 | Lesnewich et al. ............ 219/74 |
| 4,529,863 | A | * | 7/1985 | Lebel ..................... 219/137.42 |
| 4,871,898 | A | * | 10/1989 | Cherne et al. .......... 219/137 R |
| 4,973,822 | A | | 11/1990 | Evans et al. ................. 219/137 |
| 5,313,039 | A | * | 5/1994 | Harvey et al. ................. 219/74 |
| 6,274,838 | B1 | * | 8/2001 | Demers et al. ............... 219/74 |
| 6,303,891 | B1 | * | 10/2001 | Gault ........................... 219/74 |

FOREIGN PATENT DOCUMENTS

EP        0584000 A1       7/1993
WO       WO 00/24545      5/2000

OTHER PUBLICATIONS

William de Abreu Macedo et al., "Optimized Welding Consumables for Joining Coated Steels", presented at the 1998 AWS International Welding and Fabricating Exposition, Detroit, MI.
Kevin A. Lyttle, "Pulsed Metal-Cored Wires for Coated Steels" presented at the 2000 AWS Exposition and Convention; St. Louis, MO.
"Pulsed GMAW Power Perfect for Galvanneal Steel Sheet" *Welding Design and Fabrication*, May 1998.

* cited by examiner

*Primary Examiner*—Len Tran
(74) *Attorney, Agent, or Firm*—Gerald L. Coon

(57) ABSTRACT

This invention relates to a method for gas metal arc welding of coated steels, and a shielding gas therefor, in which the method comprises:
(a) forming an arc between a consumable wire electrode and a coated steel workpiece;
(b) maintaining a substantially constant arc voltage between said consumable wire electrode and the coated steel workpiece;
(c) feeding the consumable wire electrode through a welding torch contact tube into said arc;
(d) transferring metal from the consumable wire electrode to the coated steel workpiece; and
(e) shielding the arc with a gas mixture consisting essentially of:
  (i) from 6 to 10 volume percent carbon dioxide;
  (ii) from 6 to 10 volume percent helium; and
  (iii) the balance argon.

10 Claims, 3 Drawing Sheets

GAS METAL ARC WELDING OF COATED STEELS AND SHIELDING GAS THEREFOR

FIELD OF THE INVENTION

This invention relates to gas metal arc welding and more particularly, to an improved process for gas metal arc welding which can significantly improve weld quality and appearance as well as provide higher productivity for welding coated steels, e.g., galvanized, galvannealed and aluminized steels.

BACKGROUND OF THE INVENTION

Gas metal arc welding, commonly referred to as "GMAW" or "MIG" welding, is an electric arc welding process in which the arc is shielded from the ambient atmosphere by a gas or a mixture of gases. Metal is transferred to a workpiece through the arc from a consumable wire electrode. The consumable wire electrode is continuously fed into the arc at a preselected speed corresponding to a given deposition rate for a given wire size.

The optimum type of metal transfer employed with the gas metal arc process is a spray arc where fine metal droplets are transferred in a very controlled manner across the arc gap. Very little spatter is produced using this welding technique. The type of metal transfer can be obtained only with a certain combination of shielding gases and welding parameters and thus is generally produced only within a fairly narrow range of conditions.

Typically gas metal arc welding shielding gases have comprised solely carbon dioxide or have comprised mixtures of argon, carbon dioxide oxygen or helium. Each known shielding gas has a specific known range within which the process with that gas will perform acceptably well. Helium, if employed in the gas mixture, is present in a concentration generally exceeding 20 percent and is used to impart special characteristics to the weld but only when its high cost can be justified.

The use of coated steels has increased over the past few years. Typical problems experienced when arc welding coated steels include heavy spatter, porosity, poor bead appearance, and burn-off and fuming of the coating adjacent to the weld area. In many applications, poor weld bead appearance and poor weld quality are significant problems for the fabricator. Existing shielding gas/wire combinations for gas metal arc welding have not performed well on materials with galvanized, galvannealed or aluminized coatings.

Accordingly, it is an object of this invention to provide an improved gas metal arc welding method which can effectively reduce weld spatter, increase bead wetting and minimize porosity when joining galvanized, galvannealed or aluminized steels. This overall improvement in weld quality will lead to higher productivity and reduced welding costs for the user.

It is another object of this invention to provide an improved gas metal arc welding method which can employ a shielding gas which does not require the presence of a large concentration of helium and yet achieves a comparable improvement in desired weld characteristics.

SUMMARY OF THE INVENTION

This invention relates in part to a method for gas metal arc welding with a consumable wire electrode comprising:

(a) forming an arc between said consumable wire electrode and a coated steel workpiece;
(b) maintaining a substantially constant arc voltage between said consumable wire electrode and the coated steel workpiece;
(c) feeding the consumable wire electrode through a welding torch contact tube into said arc;
(d) transferring metal from the consumable wire electrode to the coated steel workpiece; and
(e) shielding the arc with a gas mixture consisting essentially of:
   (i) from 6 to 10 volume percent carbon dioxide;
   (ii) from 6 to 10 volume percent helium; and
   (iii) the balance argon.

This invention also relates in part to a shielding gas mixture for use with gas metal arc welding of coated steels consisting essentially of:

(i) from 6 to 10 volume percent carbon dioxide;
(ii) from 6 to less than 10 volume percent helium; and
(iii) the balance argon.

As used herein, the term "coated steel" means galvanized, galvannealed or aluminized steels. By practicing the method of this invention, a user can successfully weld coated steels with improved quality of the weld joints produced. The shielding gas mixtures of this invention allow users to maintain maximum manufacturing flexibility through the use of one gas mixture and multiple wire types without compromises normally associated with other gas mixtures available in the marketplace. The shielding gas mixtures are cost effective and easy to implement in either cylinder packaging or bulk form.

DETAILED DESCRIPTION OF THE INVENTION

As indicated above, this invention relates in part to method for gas metal arc welding with a consumable wire electrode comprising:

(a) forming an arc between said consumable wire electrode and a coated steel workpiece;
(b) maintaining a substantially constant arc voltage between said consumable wire electrode and the coated steel workpiece;
(c) feeding the consumable wire electrode through a welding torch contact tube into said arc;
(d) transferring metal from the consumable wire electrode to the coated steel workpiece; and
(e) shielding the arc with a gas mixture consisting essentially of:
   (i) from 6 to 10 volume percent carbon dioxide;
   (ii) from 6 to 10 volume percent helium; and
   (iii) the balance argon.

This invention also relates in part to a shielding gas mixture for use with gas metal arc welding of coated steels consisting essentially of:

(i) from 6 to 10 volume percent carbon dioxide;
(ii) from 6 to 10 volume percent helium; and
(iii) the balance argon.

Figure 1:
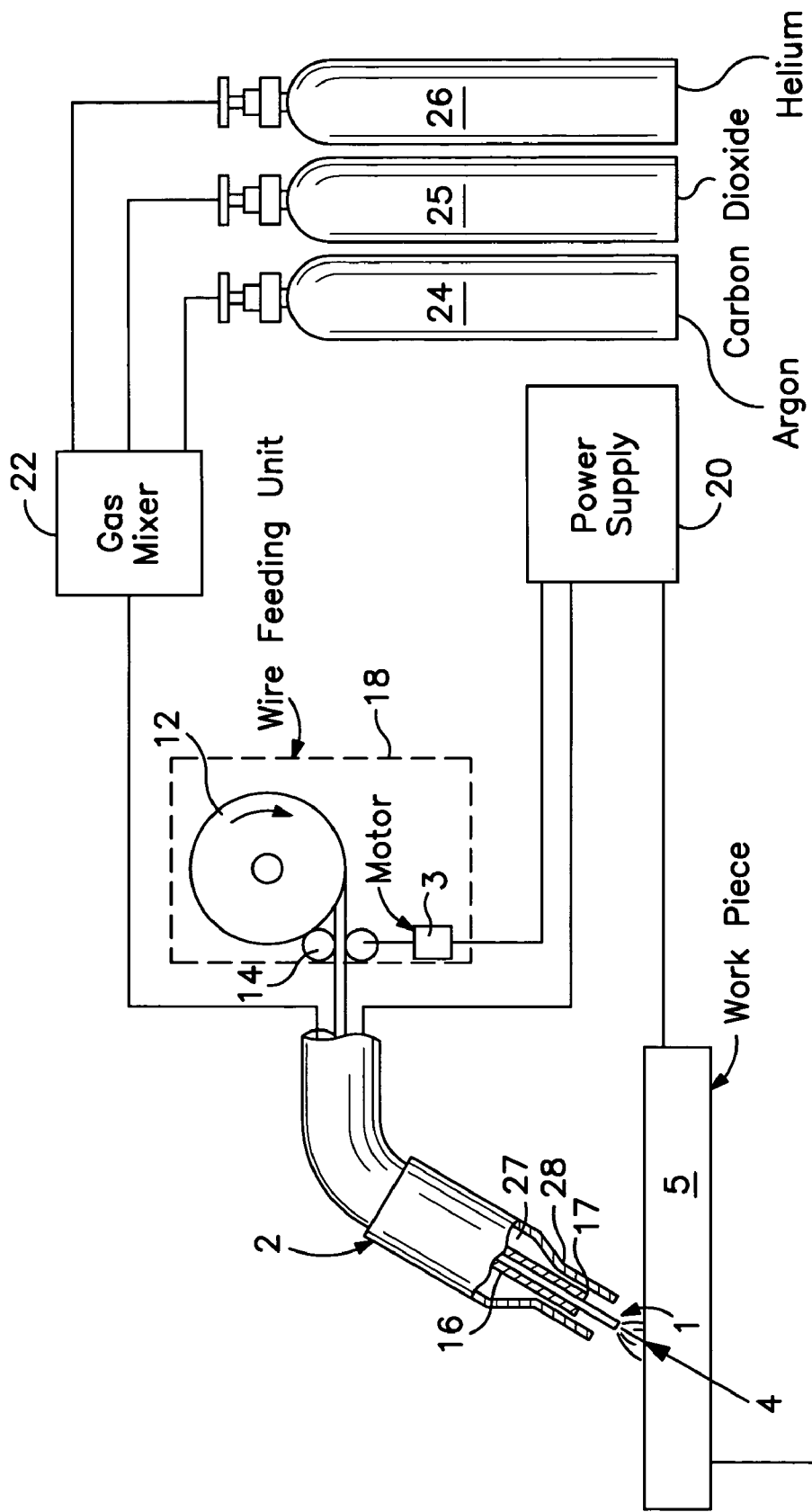
FIG. 1 is a schematic diagram of an illustrative system useful for carrying out the method of this invention.
Figure 2:
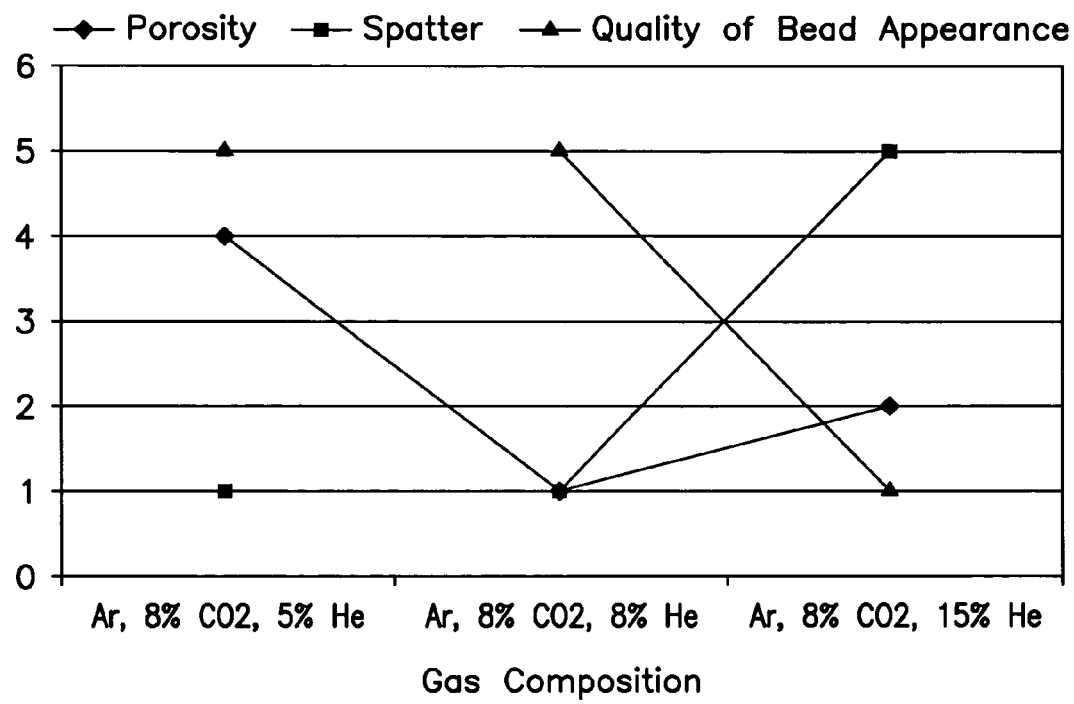
FIG. 2 depicts a gas composition comparison for galvanized coated steel.
Figure 3:
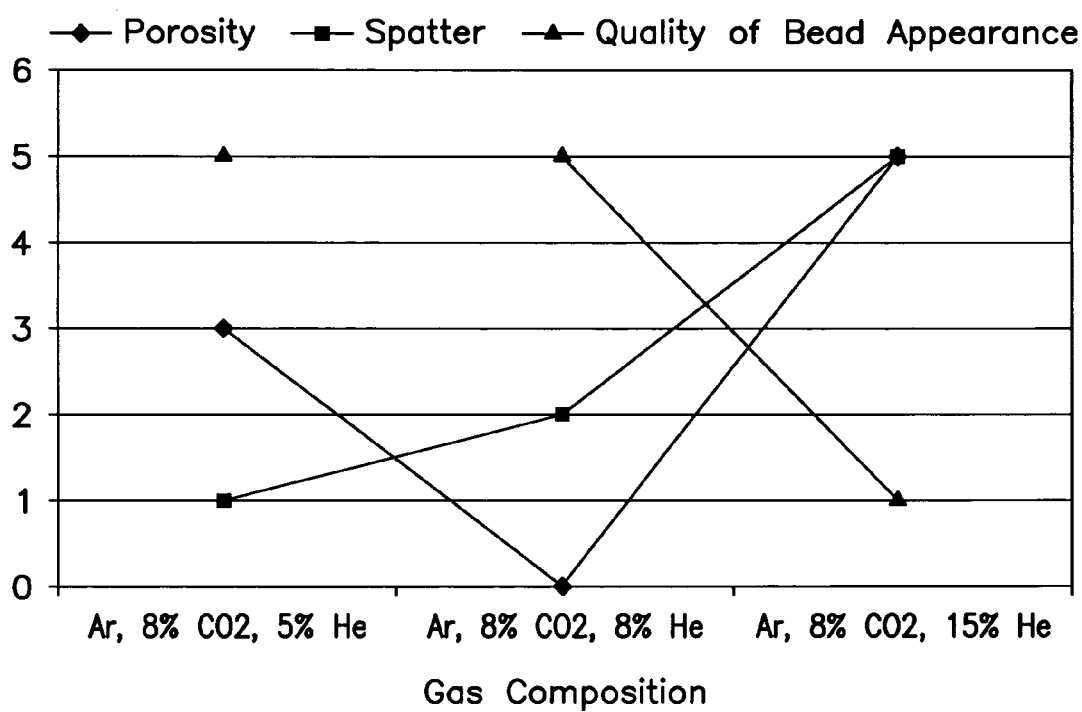
FIG. 3 depicts a gas composition comparison for galvannealed coated steel.

The invention can be described in further detail with reference to FIG. 1, FIG. 2 and FIG. 3. Referring to FIG. 1, consumable wire electrode 1 is drawn from reel 12 by feed roll 14 through contact tube 16 in gas shielded arc welding torch 2. The consumable wire electrode may have a diameter within the range of from 0.023 to 0.062 inch and may be composed of any suitable metal composition appropriate for the particular welding application. Preferably, the consumable wire electrode is a solid wire, more preferably a solid wire having silicon content of from about 0.5 to 1.0 weight percent of the total wire chemistry. The consumable wire electrode may also be a metal-cored wire developed to weld on coated steels or a flux-cored wire. Solid GMAW wires with an American Welding Society (AWS) classification of ER70S-X are preferred consumable wire electrodes for use in this invention with a low silicon content wire such as an AWS ER70S-3 wire being more preferred.

Any suitable gas shielded torch may be used to carry out the method of this invention. The torch may be either manually operated or mechanized. In the embodiment illustrated in FIG. 1, torch 2 is a mechanized torch. Feed roll 14 is driven by drive motor 3 contained in wire feeding unit 18 which can feed wire at the speeds necessary to achieve the desired deposition rates.

Power supply 20 supplies power to both wire feeding unit 18 and torch 2. Power supply 20 is voltage controlled and of the constant potential type.

In operation, an arc 4 is established between consumable electrode 1 and workpiece 5 by energizing power supply 20 feeding the electrode into direct contact with the workpiece. The arc voltage between the electrode and the workpiece is kept substantially constant during the welding process. By "substantially constant" it is meant that the arc voltage varies not more than 5 percent from the set point during the welding process. The arc voltage setpoint is at a point where a stable arc can be achieved for whichever transfer mode is chosen. The method of this invention is particularly advantageous for use with the short circuiting transfer, spray transfer, and pulsed spray transfer modes of metal transfer. The substantially constant voltage allows for a self-regulating welding condition in that as the arc length varies during welding, the wire melt off rate also varies to keep the arc voltage substantially constant. This allows for stable welding conditions to be maintained with uniform weld penetration and bead shape. The arc voltage is generally within the range of from about 17 to 40 volts, preferably from about 22 to 32 volts, with the current varying between 150 to 200 amperes. The consumable wire electrode is fed through welding torch contact tube 16 into the arc and metal is transferred from the electrode to the workpiece. The preferred welding position is in the horizontal or flat position.

The electrode 1 is fed through the contact tube 16 into the arc 4 formed between the electrode 1 and workpiece 5. Contact tube 16 is connected through torch 2 to power supply 20 for supplying power to electrode 1. Workpiece 5 is connected to ground in common with the power supply ground.

The arc is shielded from the ambient atmosphere by a gas mixture consisting essentially of from 6 to 10 percent, preferably from 7 to 9 percent, and more preferably 7.5 to 8.5 percent carbon dioxide, from 6 to 10 percent, preferably from 7 to 9 percent, and more preferably from 7.5 to 8.5 percent helium, with the balance being argon. The percentages are in volume percent. A carbon dioxide or helium concentration in the shielding gas lower than about 6 percent or greater than about 10 percent may have a deleterious effect on the weld quality.

In a preferred embodiment, the shielding gas composition should contain about 8 percent helium, about 8 percent carbon dioxide and the balance argon with a flow of gas to the weld zone of about 35 to 50 cubic feet per hour. FIG. 2 and FIG. 3 show the impact of varying the helium content on the quality attributes of the weld. When welding coated steels, quality is based mainly on three factors: porosity, spatter and weld bead appearance. Porosity and spatter should be as low as possible. In FIG. 2 and FIG. 3, the higher the number, the better the weld quality. FIG. 2 shows little difference between a shielding gas composition of argon, carbon dioxide (8 percent), and helium (5 percent) and a shielding gas composition of argon, carbon dioxide (8 percent), and helium (8 percent), except that the amount of porosity is much lower with the shielding gas having the additional 3 percent helium, i.e., the shielding gas composition of argon, carbon dioxide (8 percent), and helium (8 percent). FIG. 2 and FIG. 3 also show a large difference between a shielding gas composition of argon, carbon dioxide (8 percent), and helium (8 percent) and a shielding gas composition of argon, carbon dioxide (8 percent), and helium (15 percent) as the porosity and spatter are higher and the quality of the bead appearance is low with the shielding gas having the additional 7 percent helium, i.e., the shielding gas composition of argon, carbon dioxide (8 percent), and helium (15 percent).

Referring to FIG. 1, the shielding gas mixture useful with this invention may be made up within gas mixer 22 which receives the component gases from cylinders 24, 25 and 26. For example, cylinder 24 may contain argon, cylinder 25 may contain carbon dioxide and cylinder 26 may contain helium. Any other suitable gas storage container, such as a storage tank, may also be employed in conjunction with this invention. Gas mixer 22 can be any conventional gas mixer which can be set to meter the appropriate gas from each gas source to establish the gas mixture useful in this invention. Alternatively, the gas mixture of this invention may be supplied already mixed from a single container.

The shielding gas mixture useful in this invention is then passed through conduit means 6 to torch 2 and is passed through space 27 between contact tube 16 and torch cup 28 so that it forms a shroud for shielding arc 4 from the ambient atmosphere.

The gas metal arc welding method and shielding gas mixture of this invention enables the attainment of high quality welds with excellent appearance. This is particularly important in the welding of coated steels where appearance is generally an important factor. The preferred coated steels useful in this invention include galvanized steel with zinc coating weight of 60 g/m^2 to 90 g/m^2 and galvannealed steel with zinc coating weight of 45 g/m^2 to 60 g/m^2.

The gas metal arc welding method and shielding gas mixture of this invention have also enabled the attainment of high quality welds with reduced defects in the welding of coated steels. This invention employs a combination of shielding gas, wire type, metal transfer and process type. This combination substantially improves the quality and appearance of welds on coated steels. A major factor in this benefit is the shielding gas composition selected for use with the other method variables. The improvements produced include fewer defects, e.g., less spatter, reduced porosity, less zinc-fuming and burn-off from the vicinity of the weld joint, and overall better bead appearance. Productivity increases up to 15 percent or greater may be achieved due to the decreased amount of post-weld clean up and rework. In a preferred embodiment, the practice of the method of this invention involves gas metal arc welding with pulsed metal transfer, an ER70S-3 solid wire, a shielding gas composition of carbon dioxide (8 percent), helium (8 percent) and argon (balance), for welding a coated steel base material.

Heretofore, the ability to achieve high quality welds over a range of operating conditions and deposition rates in gas metal arc welding required a shielding gas mixture containing a high concentration of helium or the presence of oxygen in conjunction with helium carbon dioxide and argon. The shielding gas mixtures of this invention enables excellent gas metal arc welding utilizing metal transfer by various methods without using either an expensive mixture containing a high concentration of helium or a complex mixture which includes oxygen.

Various modifications and variations of this invention will be obvious to a worker skilled in the art and it is to be understood that such modifications and variations are to be included within the purview of this application and the spirit and scope of the claims.

The invention claimed is:

1. A method for gas metal arc welding with a consumable wire electrode comprising:
   (a) forming an arc between said consumable wire electrode and a coated steel workpiece;
   (b) maintaining a substantially constant arc voltage between said consumable wire electrode and the coated steel workpiece;
   (c) feeding the consumable wire electrode through a welding torch contact tube into said arc;
   (d) transferring metal from the consumable wire electrode to the coated steel workpiece; and
   (e) shielding the arc with a gas mixture consisting essentially of:
      (i) from 6 to 10 volume percent carbon dioxide;
      (ii) from 6 to 10 volume percent helium; and
      (iii) the balance argon:

wherein the consumable wire electrode is a solid wire, a solid wire having silicon content of from about 0.5 to 1.0 weight percent of the total wire chemistry, a metal-cored wire or a flux-cored wire.

2. The method of claim 1 wherein the carbon dioxide concentration is within the range of from about 7 to 9 volume percent.

3. The method of claim 1 wherein the carbon dioxide concentration is within the range of from about 7.5 to 8.5 volume percent.

4. The method of claim 1 wherein the helium concentration is within the range of from about 7 to 9 volume percent.

5. The method of claim 1 wherein the helium concentration is within the range of from about 7.5 to 8.5 volume percent.

6. The method of claim 1 wherein the electrode has a diameter within the range of from about 0.023 to 0.052 inch.

7. The method of claim 1 wherein the arc voltage is within the range of from about 22 to 32 volts.

8. The method of claim 1 wherein the coated steel comprises galvanized, galvannealed or aluminized steel.

9. The method of claim 1 which employs a short circuiting transfer, spray transfer or pulsed spray transfer mode of metal transfer.

10. The method of claim 1 wherein the carbon dioxide concentration is within the range of from about 7.5 to 8.5 volume percent, the helium concentration is within the range of from about 7.5 to 8.5 volume percent, the consumable wire electrode is a solid wire having silicon content of from about 0.5 to 1.0 weight percent of the total wire chemistry, and which method employs a pulsed spray transfer mode of metal transfer.

* * * * *